United States Patent
Chen et al.

(10) Patent No.: US 9,176,546 B2
(45) Date of Patent: Nov. 3, 2015

(54) HARD DISK ASSEMBLY

(71) Applicant: Quanta Computer Inc., Taoyuan Shien (TW)

(72) Inventors: Chao-Jung Chen, New Taipei (TW); Yaw-Tzorng Tsorng, Taipei (TW); Guo-Ming Huang, New Taipei (TW); Kun-Pei Liu, New Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 65 days.

(21) Appl. No.: 14/190,825

(22) Filed: Feb. 26, 2014

(65) Prior Publication Data

US 2015/0123519 A1 May 7, 2015

(30) Foreign Application Priority Data

Nov. 5, 2013 (TW) .............................. 102140122 A

(51) Int. Cl.
*H05K 5/00* (2006.01)
*G06F 1/18* (2006.01)

(52) U.S. Cl.
CPC ...................................... *G06F 1/187* (2013.01)

(58) Field of Classification Search
CPC ....... G06F 1/187; G06F 1/1658; G06F 1/181; G06F 1/1632; B65D 1/34; Y10T 24/44017
See application file for complete search history.

(56) References Cited

U.S. PATENT DOCUMENTS

| | | | |
|---|---|---|---|
| 4,611,864 A | | 9/1986 | Yokota |
| 5,484,063 A | * | 1/1996 | Cuccio et al. .................. 206/722 |
| 5,588,728 A | * | 12/1996 | Eldridge et al. ........... 312/332.1 |
| 5,599,080 A | * | 2/1997 | Ho .............................. 312/334.7 |
| 5,641,296 A | * | 6/1997 | Larabell et al. ................ 439/342 |
| 5,682,291 A | * | 10/1997 | Jeffries et al. ............ 361/679.58 |
| 6,407,913 B1 | * | 6/2002 | Peachey et al. ........... 361/679.57 |
| 6,421,236 B1 | * | 7/2002 | Montoya et al. ......... 361/679.58 |
| 6,625,014 B1 | * | 9/2003 | Tucker et al. ............. 361/679.34 |
| 7,272,012 B2 | * | 9/2007 | Salinas et al. .................. 361/727 |
| 7,345,237 B2 | * | 3/2008 | Chen et al. ....................... 174/50 |
| 7,400,936 B2 | * | 7/2008 | Chang .............................. 700/90 |

(Continued)

FOREIGN PATENT DOCUMENTS

| | | |
|---|---|---|
| JP | 44-027404 Y1 | 11/1969 |
| JP | 62-042353 B2 | 9/1987 |

OTHER PUBLICATIONS

Office Action mailed Nov. 4, 2014; in a corresponding Japanese patent application with English language summary.

(Continued)

*Primary Examiner* — Robert J Hoffberg
*Assistant Examiner* — Hung Dang
(74) *Attorney, Agent, or Firm* — Novak Druce Connolly Bove + Quigg LLP

(57) ABSTRACT

A hard disk assembly includes a tray, a bracket, and a carrier. The tray includes plural protrusions. The bracket is disposed on the tray for fastening a hard disk device. The bracket includes a bracket body having plural slots thereon, and plural pins disposed on opposite sides of the bracket body. The slots are respectively engaged with the protrusions. The pins are disposed between the bracket and the tray. The carrier is pivotally connected to the tray. The carrier includes two ribs. Each rib has a curved surface for touching and pulling the pins. Therefore the bracket can be slidably moved on the tray along the slots.

10 Claims, 6 Drawing Sheets

(56) References Cited

U.S. PATENT DOCUMENTS

| | | | |
|---|---|---|---|
| 7,495,904 B2* | 2/2009 | Liang et al. | 361/679.39 |
| 7,542,280 B2* | 6/2009 | Hong et al. | 361/679.33 |
| 7,684,182 B2* | 3/2010 | Zhang et al. | 361/679.33 |
| 8,004,830 B2* | 8/2011 | Lu | 361/679.33 |
| 8,023,259 B2* | 9/2011 | Lam et al. | 361/679.37 |
| 8,289,695 B2* | 10/2012 | Wu | 361/679.39 |
| 8,363,396 B2* | 1/2013 | Wu | 361/679.37 |
| 8,582,287 B2* | 11/2013 | Nguyen et al. | 361/679.37 |
| 8,644,017 B2* | 2/2014 | Dunham et al. | 361/679.33 |
| 8,749,966 B1* | 6/2014 | Boudreau et al. | 361/679.33 |
| 9,030,819 B2* | 5/2015 | He et al. | 361/679.58 |
| 2002/0085358 A1* | 7/2002 | Homer et al. | 361/730 |
| 2002/0101713 A1* | 8/2002 | Eland | 361/686 |
| 2004/0179333 A1* | 9/2004 | Xu | 361/685 |
| 2005/0063152 A1* | 3/2005 | Chen et al. | 361/685 |
| 2005/0286236 A1* | 12/2005 | Clinard | 361/727 |
| 2006/0023413 A1* | 2/2006 | Lo et al. | 361/684 |
| 2006/0171110 A1* | 8/2006 | Li | 361/685 |
| 2007/0014085 A1* | 1/2007 | Meserth et al. | 361/685 |
| 2007/0164170 A1* | 7/2007 | Huang et al. | 248/27.1 |
| 2007/0230105 A1* | 10/2007 | Su | 361/685 |
| 2008/0158810 A1* | 7/2008 | Liu et al. | 361/685 |
| 2008/0239650 A1* | 10/2008 | Fujie et al. | 361/685 |
| 2009/0059509 A1* | 3/2009 | Peng et al. | 361/685 |
| 2009/0103252 A1* | 4/2009 | Peng et al. | 361/679.4 |
| 2009/0152415 A1* | 6/2009 | Yang et al. | 248/201 |
| 2009/0273896 A1* | 11/2009 | Walker et al. | 361/679.33 |
| 2010/0187957 A1* | 7/2010 | Liang | 312/223.2 |
| 2011/0289521 A1* | 11/2011 | Chen | 720/601 |
| 2013/0201626 A1* | 8/2013 | Bondurant et al. | 361/679.58 |
| 2014/0016262 A1* | 1/2014 | Lo | 361/679.33 |
| 2014/0016275 A1* | 1/2014 | Takasaki et al. | 361/727 |

OTHER PUBLICATIONS

English language abstract for JP 62-042353 B2; published Sep. 8, 1987.

English language abstract for JP 44-027404 Y1; published Nov. 15, 1969.

* cited by examiner

HARD DISK ASSEMBLY

RELATED APPLICATIONS

This application claims priority to Taiwan Application Serial Number 102140122, filed Nov. 5, 2013, which is herein incorporated by reference.

BACKGROUND

1. Field of Invention

The present invention relates to a hard disk assembly.

2. Description of Related Art

With the progress of the technology and the growing dependence of computer systems, market requirements for computing power and data storage capacity of the computer systems are increasing. However, available spaces in the office or workshop are becoming limited, the spaces occupied by computers and corresponding devices are expected to be small and compact in size. For example, the size of the server, a peripheral device of the computers, has become increasingly small, and thus the spaces available for the arrangement of hardware devices in the server are also limited.

For effectively storing data and offering the required data access to users, a server must have many hard disks and other storage mediums. Various components, including the motherboard of the server, the aforementioned storage media, and other built-in computer peripheral devices, are all set in a single cabinet for effectively offering the service of data access to the users. Taking an assembly of the hard disks for example, the easiest way is to fasten the hard disks with screws in the assembly; however, since the spaces inside the cabinet are limited, the hard disks fastened with the screws is very difficult to be disassembled due to the need of screwdrivers, or the likes.

SUMMARY

The invention provides a tool less hard disk assembly for enhancing the assembly efficiency of hard disks.

One embodiment of this invention provides a hard disk assembly, includes a tray, a bracket, and a carrier. The tray includes multiple protrusions. The bracket is disposed inside the tray for fastening the hard disk, and the bracket includes a bracket body, plural slots disposed on the bracket body, and plural pins disposed on the opposite sides of the bracket body. The slots are engaged to the protrusions respectively. The pins are disposed between the bracket and the tray. The carrier pivotally connects to the tray, and the carrier includes two ribs, each rib comprising a curved surface for touching and pulling the pins, so that the bracket is slidably moved relative to the tray along the slots.

In one or more embodiment of this invention, the tray includes a bottom plate, two sidewalls standing at the opposite sides of the bottom plate, and guide walls disposed on the bottom plate. The protrusions are disposed on the guide walls respectively, and the protrusions are disposed between guide walls and the sidewalls respectively.

In one or more embodiment of this invention, the bracket body includes a first segment and two second segments respectively bending from opposite sides of the first segment, in which the slots and the pins are disposed on the second segments.

In one or more embodiment of this invention, the tray includes a plurality of position pins disposed at the place adjacent to the first segment on the second segments for positioning the hard disk in the bracket.

In one or more embodiment of this invention, the hard disk assembly includes an engaging structure for fastening the carrier to the tray.

In one or more embodiment of this invention, the engaging structure includes an aperture disposed on the first segment, and a flexible bolt disposed on the carrier. The flexible bolt is inserted into the aperture for fastening the carrier.

In one or more embodiment of this invention, the first segment includes a recession, and the aperture is disposed on the recession. The carrier includes a jointing plane corresponding to the recession, and the flexible bolt is flexibly connected to jointing plane.

In one or more embodiment of this invention, hard disk assembly includes a connecting structure for pivotally connecting the carrier to the tray.

In one or more embodiment of this invention, each rib includes a flange disposed the curved plane near an end of the connecting structure for pushing the pins.

In one or more embodiment of this invention, hard disk assembly includes a plurality of push rods disposed on the inner surface of the carrier, and the push rods are adjacent to the connecting structure.

The hard disk assembly provides a fastening method independent of assembly tools, in which the hard disks can be exposed or positioned simply by opening or closing the carrier pivotally connected to the tray in the absence of additional assembly tools, and the assembly efficiency and convenience are effectively enhanced.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. It will be apparent for those skilled in the art and understanding the present invention that various modifications and variations can be made to the structure of the present invention without departing from the scope or spirit of the invention.

For eliminating the use of the screwdriver and removal tools in the disassembly of hard disks, the present invention provides a hard disk assembly offering a fastening method independent of screws, and the fastening process of the hard disks can be carried out in the absence of additional assembly tools for enhancing the assembly efficiency of the hard disks.

Figure 1:
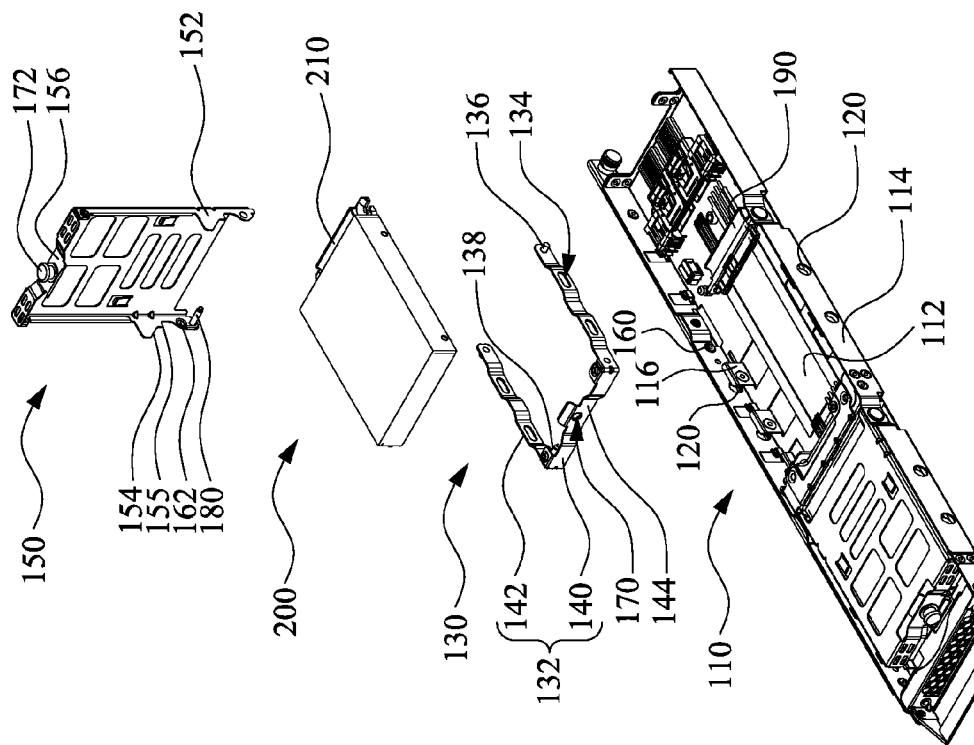
FIG. 1 is an exploded view of an embodiment of the hard disk assembly of the present invention.

FIG. 1 is an exploded view of an embodiment of the hard disk assembly of the present invention. The hard disk assembly 100 is used for fastening a hard disk 200 and the hard disk assembly 100 includes a tray 110, a bracket 130, and a carrier 150. The bracket 130 is disposed on the tray 110, and the carrier 150 is pivotally connected to the tray 110. The hard disk 200 can be disposed inside the bracket 130, and when the carrier 150 rotates relative to the tray 110, the bracket 130 and the hard disks 200 within the bracket 130 can be fastened between the carrier 150 and the tray 110.

The tray 110 includes a bottom plate 112, two sidewalls 114 standing at the opposite sides of the bottom plate 112, and two guide walls 116 disposed on the bottom plate 112. An accommodating place forms between the guide walls 116 and the sidewalls 114 for disposing the bracket 130. The tray 110 includes plural protrusions 120 disposed on the guide walls 116, and the protrusions 120 protrude toward the sidewalls 114.

The bracket 130 is disposed in the tray 110. The shape of bracket 130 is like the left square bracket. The bracket 130 includes a bracket body 132, plural slots 134 disposed on the bracket body 132, and two pins 136 disposed on the bracket body 132.

The bracket body 132 includes a first segment 140 and two second segments 142 bending from opposite sides of the first segment 140 respectively. The first segment 140 and two second segments 142 constitute a structure with the shape of the left square bracket. The bracket body 132 can be made by the way of folding sheet metal parts.

The slots 134 are disposed on the second segments 142 as elongated openings, in which the axial of the slots 134 are approximately parallel to the bottom plate 112 of the tray 110. In the assembly of the bracket 130, the slots 134 are coupled to the protrusions 120 of the tray 110 for positioning the bracket 130 on the tray 130.

The structure of ribs 136 can be cylinders and two ribs 136 are disposed on the two second segments 142 respectively. The ribs 136 are disposed on the outer surfaces of the second segments 142. After the bracket 130 being disposed on the tray 110, the protrusions 136 face the sidewalls 114, and the protrusions 136 are disposed in the accommodating place between the sidewalls 114 and the guide walls 116.

The carrier 150 has a frame-shape structure, and the carrier 150 can be pivotally connected to the tray 110 through a connecting structure. For example the connecting structure includes a spindle portion 160 disposed on the sidewalls 114 of the tray 110, and an opening portion 162 disposed on the carrier 150. By rotating the spindle portion 160 inside the opening portion 162, it can be achieved that the carrier 150 is pivotally connected with the tray 110. The external diameter of an end of the spindle portion 160 is better greater than the internal diameter of the opening portion 162, preventing the spindle portion 160 from easily escaping from the opening portion 162.

The carrier 150 includes two ribs 152 disposed on the opposite edges of the carrier 150 respectively. The ribs 152 are disposed at the positions corresponding to the protrusions 136. Each rib 152 has a curved surface 154 for contacting and pushing the protrusion 136, so that the bracket 130 is slidably moved relative to the tray 110 along the slots 134.

Figure 2:
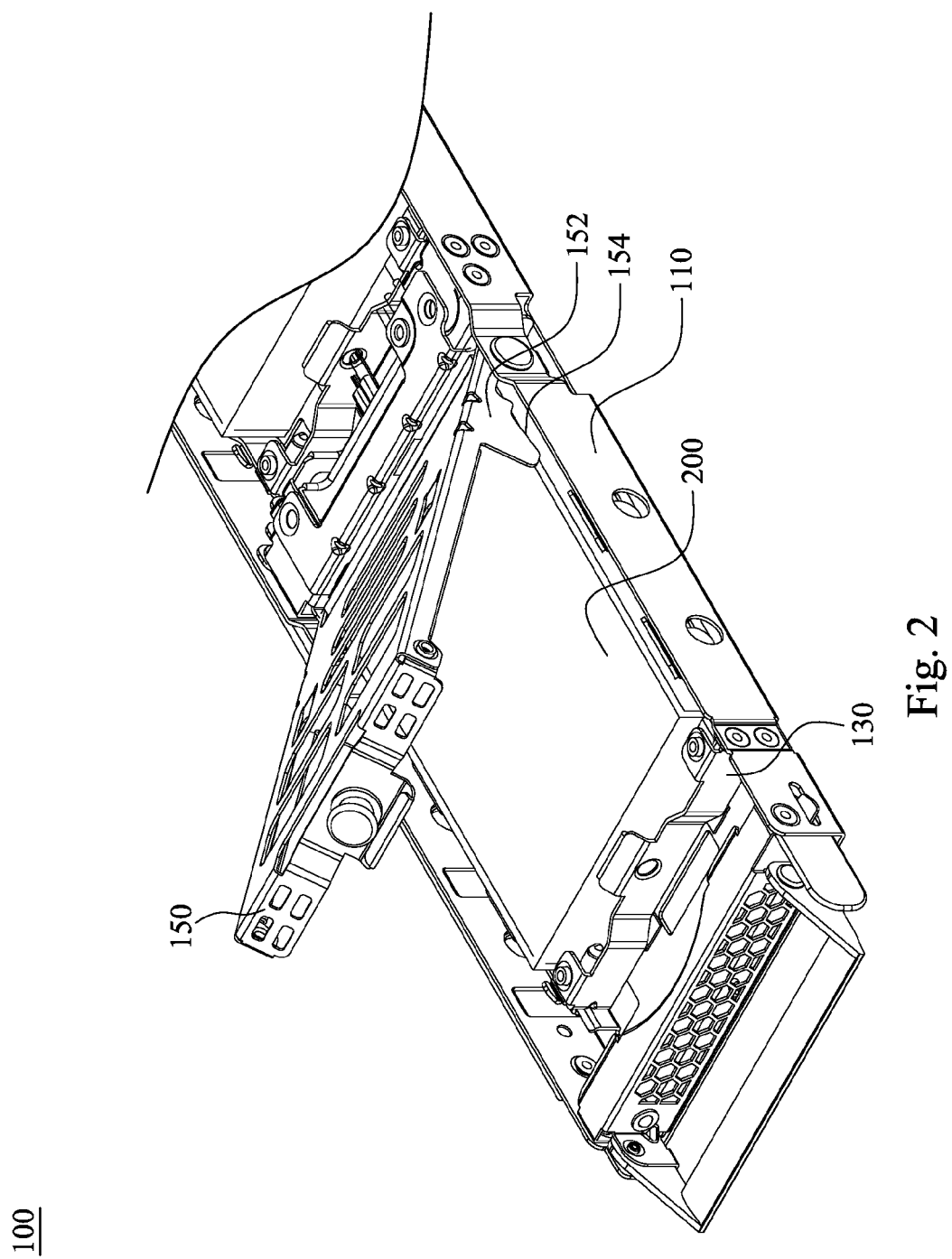
FIG. 2 is a schematic view at the operation of the hard disk assembly applications in the FIG. 1.

FIG. 2 is an operation schematic view at the applications of the hard disk assembly 100 in the FIG. 1. It should be noted that, though each tray 110 in the FIG. 1 is equipped with two hard disks 200 disposed one after another, for simplifying the illustration, the fastening method is illustrated only by one single hard disk 200 in the following figures. People skilled in the art can change the relationship between the number of tray 110 and the hard disk 200 of the hard disk assembly 100 and the arrangement of the hard disk 200 according to the different design requirement, which should not be restricted to the description of the embodiments contained herein.

The hard disk assembly 100 comprises a tray 110, a bracket 130 disposed on the tray 110, and a carrier 150 pivotally connected to the tray 110, in which the bracket 130 is disposed between the tray 110 and the carrier 150.

To assemble the hard disk 200, the first step is to open the carrier 150 to expose the bracket 130, and the second step is to put the hard disk 200 into the bracket 130. Then, the third step is to press down the carrier 150 so that the ribs 152 of the carrier 150 contact the protrusions 136 (referring to FIG. 1) of the bracket 130, and the bracket 130 and the hard disk 200 within the bracket 130 are pushed slidably and moved relative to the tray 110 to the specific position.

Figure 3:
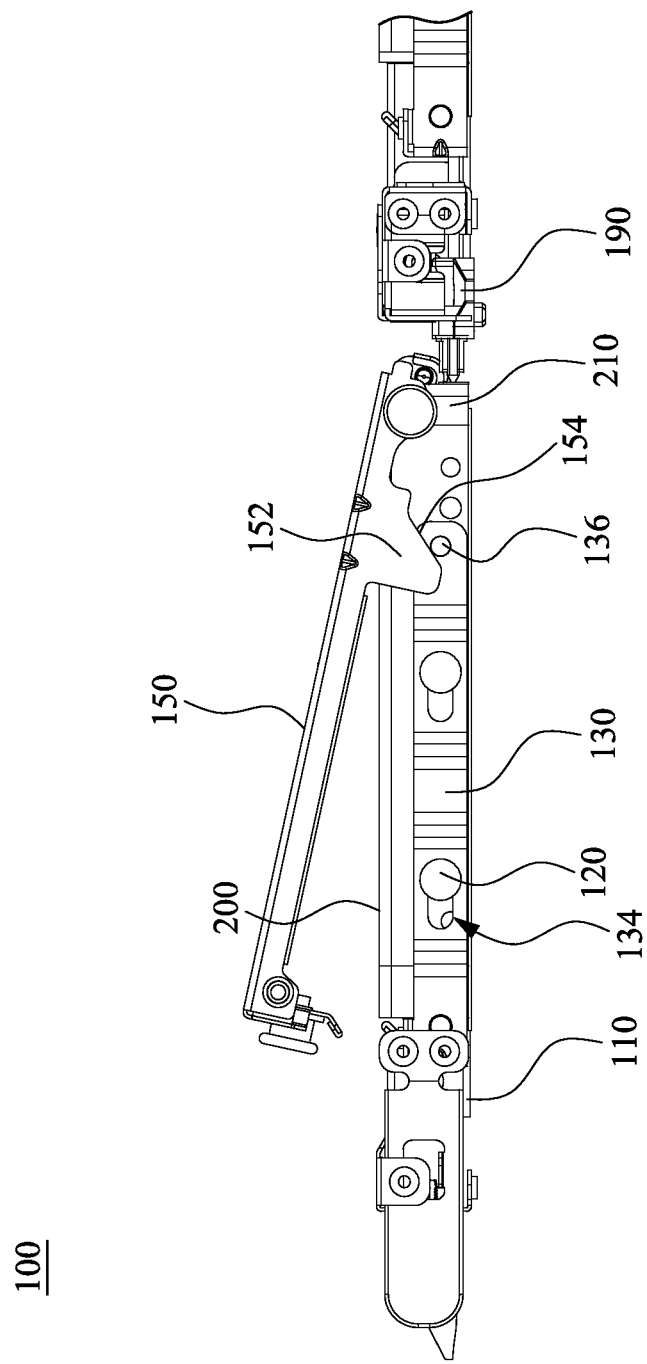
FIG. 3 and FIG. 4 are oblique views of different stages of the bracket sliding of an embodiment of the present invention respectively.
Figure 4:
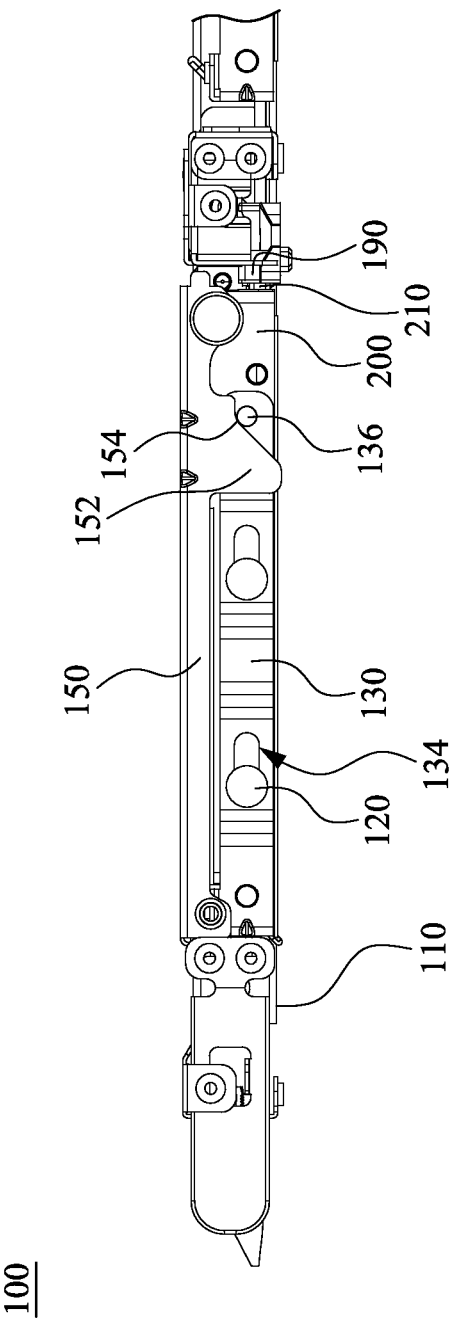

FIG. 3 and FIG. 4 are oblique views of different stages of the sliding of the bracket 130 of an embodiment of the present invention respectively. For simplifying the description, the guide walls and the sidewalls of tray 110 are hidden in the FIG. 3 and FIG. 4. In FIG. 3 in accordance with FIG. 1, after the hard disk 200 is put into the bracket 130, the carrier 150 pivotally rotates relatively to the tray 110 and is pressed down, as the carrier 150 rotates counter-clockwise as in the figure in the embodiment. After the carrier 150 moving to the preserved position, the ribs 152 stretch into the space between guide walls 116 and sidewalls 114 (FIG. 1) and contact the protrusions 136 on the outer surface of the bracket 130.

Then, keeping pressing down the carrier 150 drives the ribs 152 to move downward. At this time, through the curved surfaces 154 of the ribs 152, the pins 136 contacted with the ribs 152 move along the curved surfaces 154. For instance, the pin 136 moves to right side of the figure. Therefore, the bracket 130 and the hard disk 200 disposed inside the bracket 130 are together driven to move to the right side when the carrier 150 is pressed down.

The bracket 130 and the hard disk 200 within the bracket 130 move along the slots 134 relative to the tray 110. As the bracket 130 moves, the relative position between the slots 134 and the protrusions 120 also changes. For example, the protrusions 120 move from one end to another end of the slots 134 for positioning the bracket 130.

Reference is made to both FIG. 3 and FIG. 4, the hard disk 200 can electrically connect the peripheral electronic devices through the connector. In this embodiment, the tray 110 is equipped with a first connector 190, and hard disk 200 has a corresponding second connector 210. When the bracket 130 drives the hard disk 200 to move right to the position, the second connector 210 of the hard disk 200 engages with the first connector 190 of the tray 110.

Reference is now made to FIG. 1, for successful engagement between the first connector 190 of the tray 110 and the second connector 210 of the hard disk 200, and preventing from the engagement failure due to the spring back force resulted by contact of the first connector 190 and the second connector 210, the bracket 130 further includes two position pins 138 disposed at the place adjacent to the first segment 140 on the second segment 142 respectively, for positioning the hard disk 200 inside the bracket 130.

More specifically, position pins 138 can be used to withstand the hard disk 200 at the engagement between the first connector 190 and the second connector 210, preventing the hard disk from moving back due to the force, and further ensuring the success of engagement between the first connector 190 and the second connector 210.

Referring to FIG. 1, to safely fasten the carrier 150 to the bracket 130, and to achieve the purpose of fastening the hard disk 200 inside the bracket 130, the hard disk assembly 100 further includes an engaging structure to fasten the carrier 150 to the bracket 130. The engaging structure includes an aperture 170 on first segment 140 of the bracket 130, and a flexible bolt 172 disposed on the carrier 150. When the carrier 150 rotates to the position and contacts the bracket 130, users can pull out the flexible bolt 172 and insert the flexible bolt 172 into the aperture 170, so that the carrier 150 is fastened on the bracket 130.

More specifically, the first segment 140 includes a recession 144, and the aperture 170 is disposed on the recession 144. The carrier 150 includes a jointing plane 156 corresponding to the recession 144, and the flexible bolt 172 is flexibly connected to the jointing plane 156.

Figure 5:
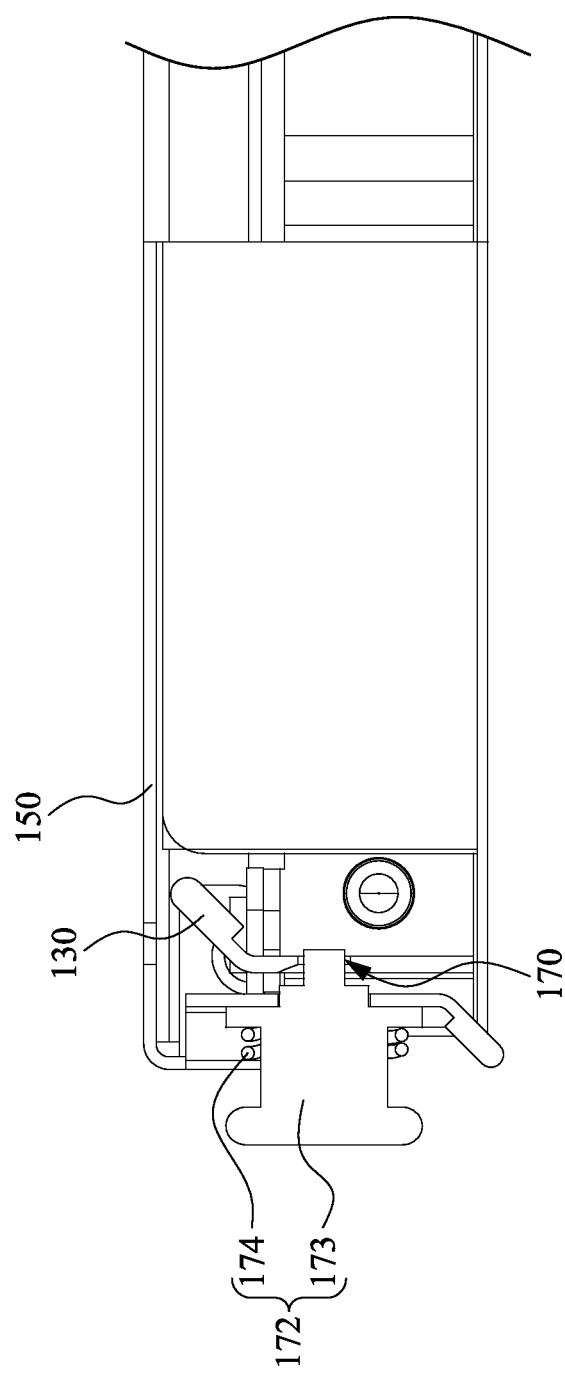
FIG. 5 is a cross-sectional view at the place of the flexible bolt of the hard disk assembly of the present invention.

Referring to the FIG. 5 accordance with FIG. 1, FIG. 5 is a cross-sectional view at the flexible bolt 172 of the hard disk assembly 100 of the present invention. The flexible bolt 172 includes a bolt portion 173 and a spring 174 connecting the bolt portion 173 and the carrier 150. After the carrier 150 moving to the position, users can pull the bolt portion 173 to move the bolt portion 173 outward, so the jointing plane 156 of the carrier 150 is interlocked with the recession 144 of the bracket 130. Then, unlocking the bolt portion 173 makes the bolt portion 173 be retracted by the flexible force of the spring 174 and engage with the aperture 170. As a result, the carrier 150 can be fastened on the bracket 130.

To take out the hard disk 200 simply needs to reversely operate the above steps, including pulling the bolt portion 173 out of the aperture 170, and rotating the carrier 150 clockwise as in the figure. Then the carrier 150 can be open, and the hard disk 200 disposed between the carrier 150 and the tray 110 can be taken out.

However, for enhancing the convenience for users to take out the hard disk 200, it is necessary to unlock the connection between the second connector 210 of the hard disk 200 and the first connector 190 of the tray 110 before the hard disk 200 is taken out. Therefore, the hard disk assembly 100 further includes a functional design for unlocking the connection between the first connector 190 and the second connector 210, and pushing out the bracket 130.

Reference is made to FIG. 1, the ribs 152 of the carrier 150 include flanges 155 disposed at the ends of the curved surfaces 154 adjacent to the place of pivotal connection (connecting structure) between the carrier 150 and the tray 110. When the carrier 150 is rotated to open, the flanges 155 contact the protrusions 136 and rotate with the carrier 150, so the protrusions 136 are pushed out. As a result, the hard disk 200 and the bracket 130 are roughly pushed outward, and the connection between the first connector 190 and the second connector 210 is further unlocked.

Figure 6:
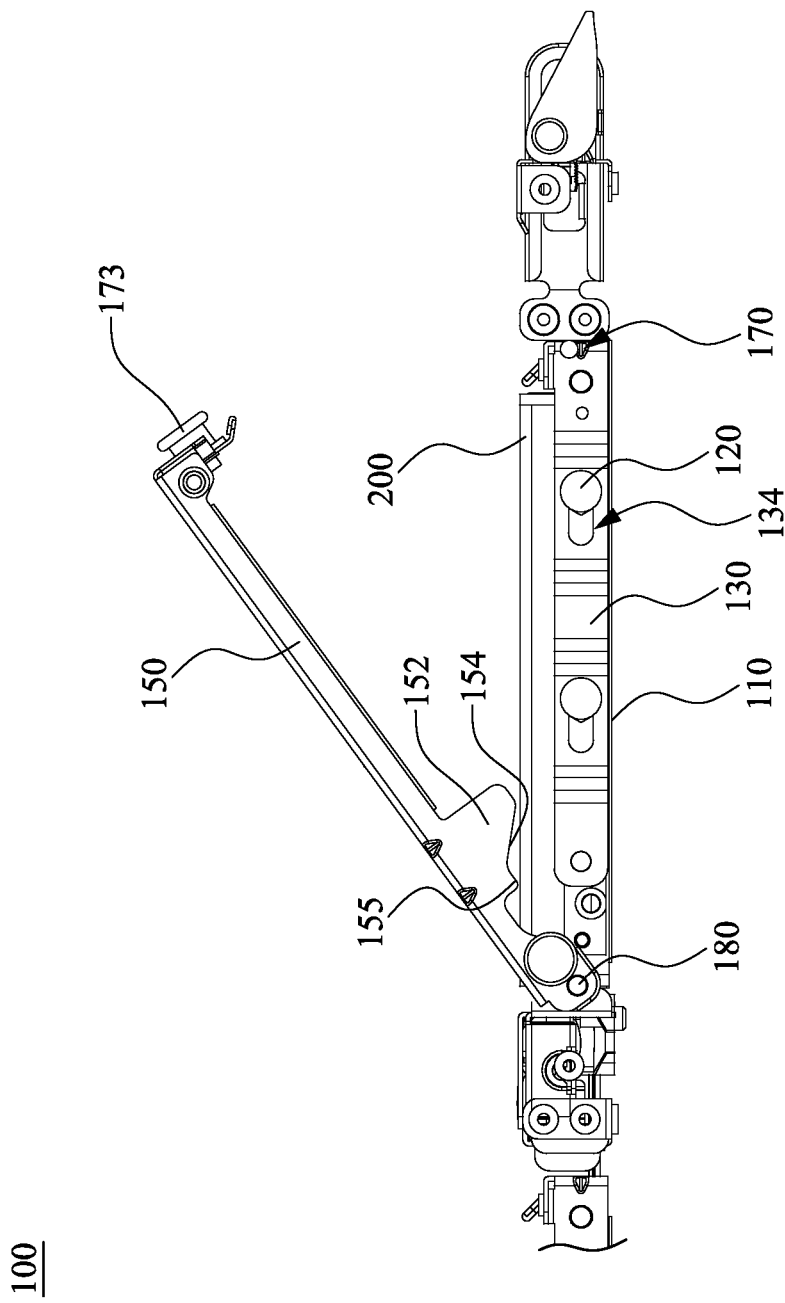
FIG. 6 is an oblique view of another viewing angle when the hard disk assembly of the present invention is open.

Reference is made to both FIG. 1 and FIG. 6, in which FIG. 6 is an oblique view of another viewing angle when the hard disk assembly 100 of the present invention is open. Similarly, the guide walls and the sidewalls are hidden of the tray 110 in the FIG. 6. By pulling the bolt portion 173 out of the aperture 170 at first, and then rotating the carrier 150 counterclockwise as in the figure, users can open the carrier 150, and the hard disk 200 between the carrier 150 and the tray 110 can be taken out.

For enhancing the convenience for users to take out the hard disk 200, the hard disk assembly 100 further includes plural push rods 180 disposed on the inner surface of the carrier 150 and near the place of pivotal connection (which is connecting structure) between the carrier 150 and the tray 110. The push rods 180 can further push the hard disk 200 and the bracket 130 at the same time of rotating the carrier 150, which makes the bracket 130 and the hard disk 200 within of the bracket 130 slidably move away from the place of pivotal connection relative to the tray 110 along the slots 134, for enhancing the convenience for users to take out the hard disk 200 inside the bracket 130 after opening the carrier 150.

In summary, hard disk assembly provides a hard disk fastening method independent of screws. By opening or closing the carrier pivotally connected to the tray, the hard disk can be exposed or positioned in the absence of additional assembly tools, which enhances the efficiency and convenience of the assembly.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A hard disk assembly comprising:
a tray comprising a plurality of protrusions;
a bracket disposed in the tray for fastening a hard disk device, the bracket comprising:
a bracket body;
a plurality of slots disposed on the bracket body, the slots being respectively engaged with the protrusions; and
two pins disposed on opposite sides of the bracket body, the pins being disposed between the bracket and the tray; and
a carrier pivotally connected to the tray, the carrier comprising two ribs, each rib comprising a curved surface for touching and pulling the pins, so that the bracket is slidably moved relative to the tray along the slots.
2. The hard disk assembly of claim 1, wherein the tray comprises:
a bottom plate;
two sidewalls standing on opposite sides of the bottom plate; and
a plurality of guide walls disposed on the bottom plate, wherein the pins are disposed on the guide walls, and the pins are respectively located between the guide walls and the sidewalls.
3. The hard disk assembly of claim 1, wherein the bracket body comprises a first segment and two second segments respectively bending from opposite sides of the first segment, wherein the slots and the pins are disposed on the second segments.
4. The hard disk assembly of claim 3, wherein the tray comprises a plurality of position pins disposed on the second segments adjacent to the first segment for positioning the hard disk in the tray.
5. The hard disk assembly of claim 3, further comprising an engaging structure for fastening the carrier to the tray.
6. The hard disk assembly of claim 5, wherein the engaging structure comprises an aperture disposed on the first segment and a flexible bolt disposed on the carrier, wherein the flexible bolt is inserted into the aperture for fastening the carrier.
7. The hard disk assembly of claim 6, wherein the first segment comprises a recession, and the aperture is disposed on the recession, and wherein the carrier comprises a jointing plane corresponding to the recession, and the flexible bolt is flexibly connected to the jointing plane.
8. The hard disk assembly of claim 1, further comprising a connecting structure for pivotally connecting the carrier to the tray.
9. The hard disk assembly of claim 8, wherein each of the ribs comprises a flange disposed on the curved plane near a side of the connecting structure for pushing the pin.

10. The hard disk assembly of claim 8, further comprising a plurality of push rods disposed on an inner surface of the carrier, and the push rods are adjacent to the connecting structure.

* * * * *